United States Patent [19]

Anderson et al.

[11] Patent Number: 5,614,799
[45] Date of Patent: Mar. 25, 1997

[54] BRUSHLESS DIRECT CURRENT MOTOR HAVING ADJUSTABLE MOTOR CHARACTERISTICS

[75] Inventors: William G. Anderson, Victoria, Minn.; William C. McAdams, Melbourne, Fla.

[73] Assignee: MTS Systems Corporation, Eden Prairie, Minn.

[21] Appl. No.: 582,029

[22] Filed: Jan. 2, 1996

Related U.S. Application Data

[63] Continuation of Ser. No. 451,013, May 25, 1995, abandoned, which is a continuation of Ser. No. 274,819, Jul. 14, 1994, abandoned.

[51] Int. Cl.$^6$ ............................................. H02P 7/48
[52] U.S. Cl. ......................... 318/439; 318/771; 318/773; 318/783; 318/138; 318/778; 318/776
[58] Field of Search ................................... 318/138, 139, 318/254, 245, 439, 779–833

[56] References Cited

U.S. PATENT DOCUMENTS

| | | |
|---|---|---|
| 1,467,745 | 9/1923 | Zeberbohm . |
| 3,573,590 | 4/1971 | Reed .................................. 318/618 |
| 3,611,082 | 10/1971 | Schmitz ............................. 318/771 |
| 3,624,471 | 11/1971 | Japp et al. ...................... 318/225 R |
| 3,916,257 | 10/1975 | Harper, Jr. ....................... 318/771 |
| 4,477,760 | 10/1984 | Kuznetsov ........................ 318/773 |
| 4,479,078 | 10/1984 | Kidd et al. ....................... 318/254 |
| 4,675,591 | 6/1987 | Pleiss ............................... 318/773 |
| 4,691,155 | 9/1987 | Taylor et al. .................... 318/771 |
| 4,736,147 | 4/1988 | Shizhang .......................... 318/778 |
| 4,890,049 | 12/1989 | Auinger ............................ 318/771 |
| 4,988,273 | 1/1991 | Faig et al. ....................... 425/145 |
| 5,049,800 | 9/1991 | Kohari et al. .................... 318/771 |
| 5,065,305 | 11/1991 | Rich .................................. 318/771 |
| 5,068,559 | 11/1991 | Satake et al. ................. 318/771 X |
| 5,068,587 | 11/1991 | Nakamura ........................ 318/771 |
| 5,130,628 | 7/1992 | Owen ................................ 318/789 |
| 5,134,332 | 7/1992 | Nakamura et al. .............. 310/208 |
| 5,142,213 | 8/1992 | Stelter .............................. 318/771 |
| 5,177,423 | 1/1993 | Nakamura et al. .............. 318/767 |
| 5,274,317 | 12/1993 | Utley et al. ...................... 318/802 |
| 5,296,796 | 3/1994 | Clower ............................. 318/808 |
| 5,300,870 | 4/1994 | Smith ............................... 318/768 |
| 5,317,248 | 5/1994 | Utley et al. ...................... 318/811 |
| 5,350,988 | 9/1994 | Le .................................... 318/618 |
| 5,352,964 | 10/1994 | Nakamura et al. .............. 318/772 |
| 5,486,747 | 1/1996 | Welch .............................. 318/811 |

OTHER PUBLICATIONS

William G. Anderson, Custom Servo Motors Inc., New Ulm, Minn., "*NdFeB Magnet Material In High Performance Brushless Servo Motors*", Mar. 1992 issue of Motion Control Magazine, pp. 1–6.

*Primary Examiner*—Paul Ip
*Attorney, Agent, or Firm*—Westman, Champlin & Kelly

[57] ABSTRACT

A brushless direct current motor includes a permanent magnet mounted to a rotor and a set of commutated stator windings. The motor further includes a circuit for changeably connecting the set of stator windings to operate in a first electrical configuration or a second electrical configuration and a circuit for commutating the set of stator windings when connected in the first electrical configuration or the second electrical configuration.

21 Claims, 5 Drawing Sheets

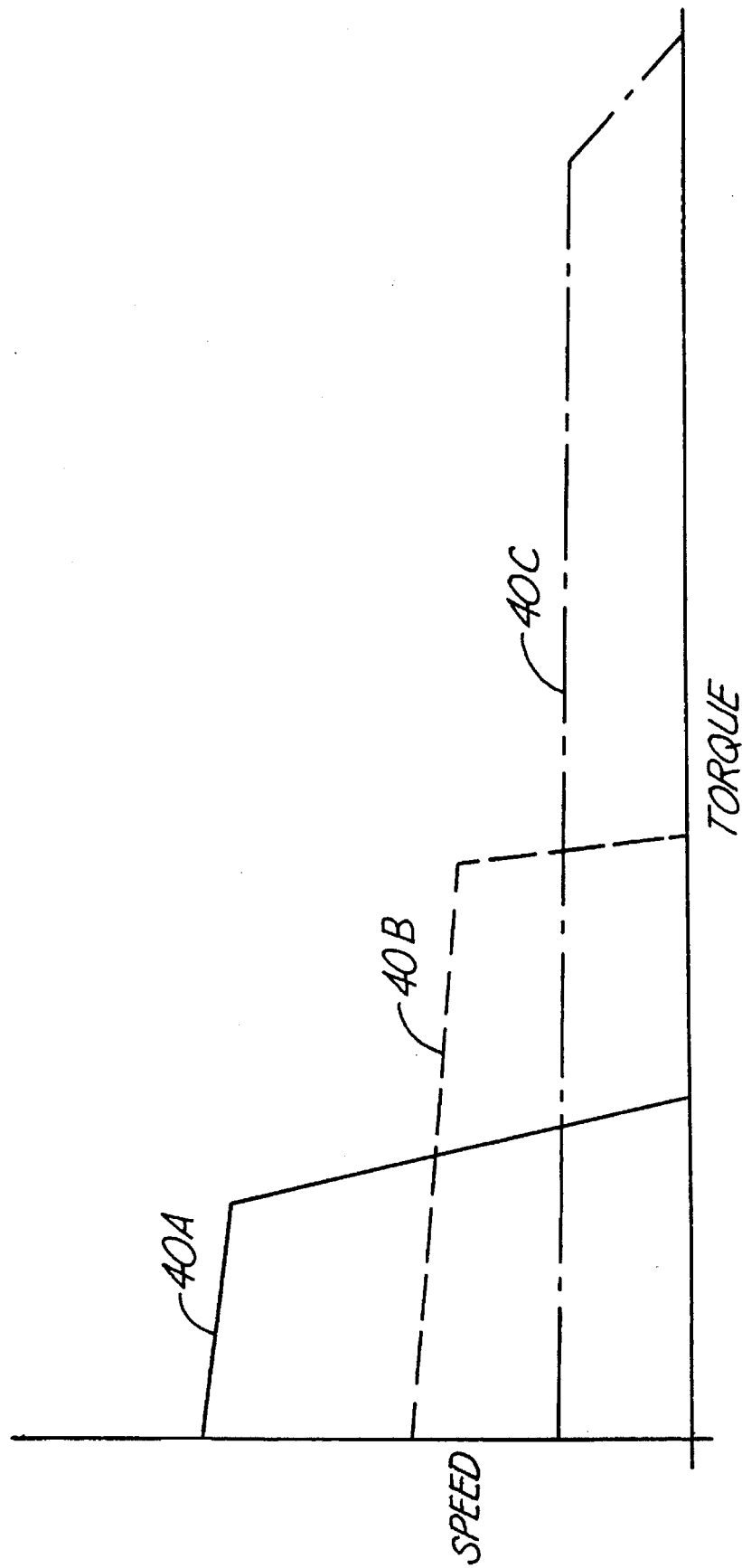

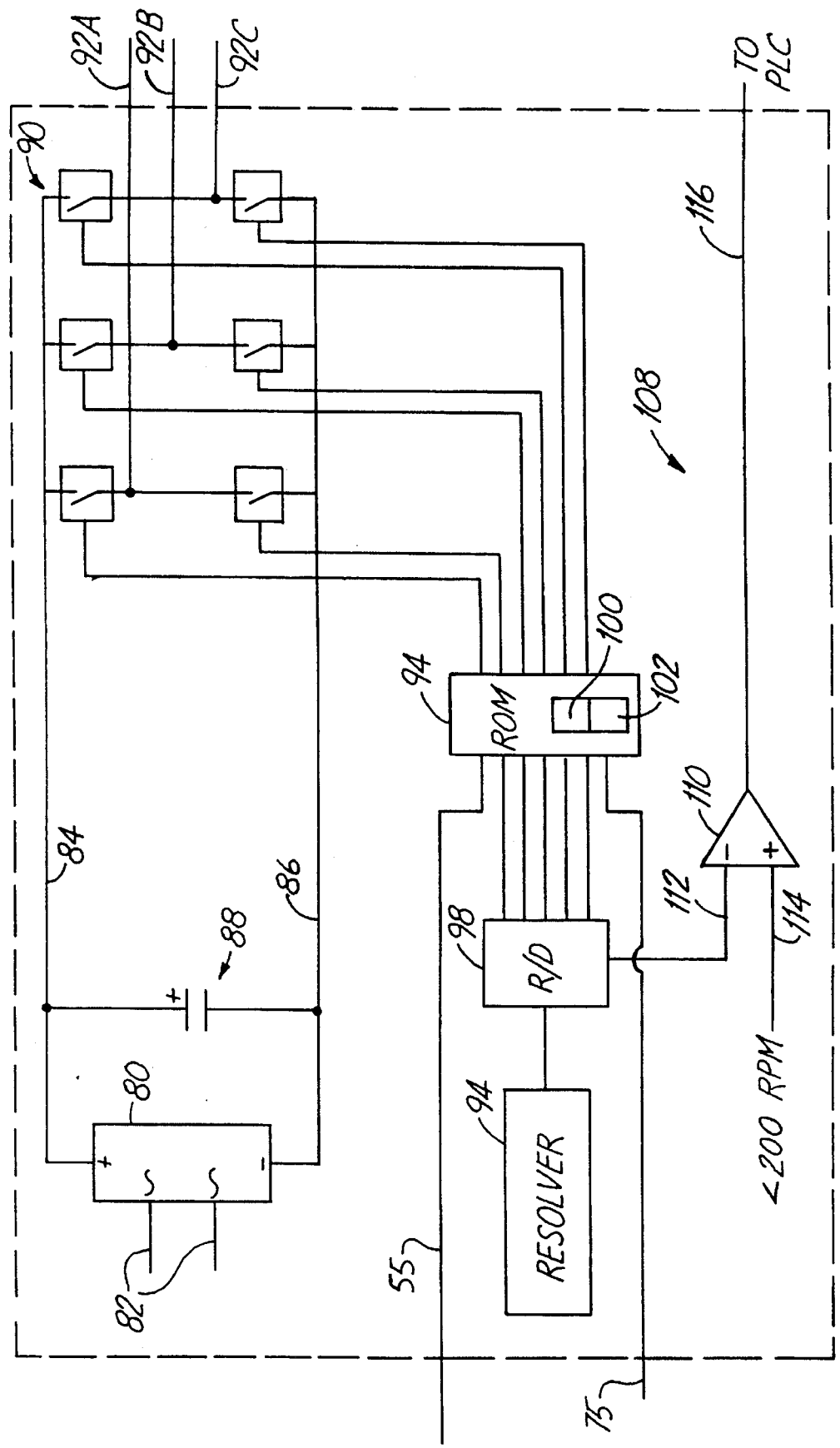

BRUSHLESS DIRECT CURRENT MOTOR HAVING ADJUSTABLE MOTOR CHARACTERISTICS

This is a continuation of application Ser. No. 08/451,013, filed May 25, 1995, now abandoned which is a continuation of application Ser. No. 08/274,819, filed on Jul. 14, 1994, now abandoned. Priority of the prior application is claimed pursuant to 35 USC § 120.

BACKGROUND OF THE INVENTION

The present invention relates to a brushless direct current motor having permanent magnets mounted to a rotor and commutated stator windings. More particularly, the present invention relates to a brushless direct current motor having adjustable speed and torque characteristics.

Brushless direct current motors with electronically commutated stator windings and permanent magnets mounted to the rotor are currently a subject of much interest. These motors provide a means of meeting the increasing demand for controllable, high-speed, low-maintenance motors for an ever increasing range of power ratings. The motor includes an inverter that applies commutated voltage and current to each phase of the stator windings. The speed of the motor is controlled by controlling the voltage amplitude applied to the stator windings, while the torque output from the motor is linearly proportional to the current through the windings. Commonly, the stator windings are connected either in a delta electrical configuration or a wye electrical configuration, depending on the desired motor performance. For example, if maximum speed is desired from a motor of a given horsepower rating, the stator windings are hard wired in a delta electrical configuration. If, on the other hand, maximum torque is desired from the motor, the stator windings are hard wired in a wye electrical configuration.

In many applications, however, it is not possible to choose a brushless direct current motor of the prior art that will have optimum motor characteristics for a given mechanical load. This is the case since many mechanical loads are not constant over time. Rather, both the operating speed and, more importantly, the torque required from the motor will vary over time. When motors are used in manufacturing processes, it is generally desirable to have high operating speeds in order to increase the rate of production of goods. Since large amounts of torque will also be required from the motor, the motor is generally over-rated for its intended use. In a brushless direct current motor, expensive inverters capable of handling the increased current necessary to generate the torque must be used. Likewise, larger diameter wires must also be used throughout the motor to handle the increased current, and additional heat dissipating devices must be used to dissipate the heat generated from these larger components. Accordingly, the size, weight and complexity of the motor will increase, increasing its cost and thereby making it less attractive for the intended use.

SUMMARY OF THE INVENTION

A brushless direct current motor includes a permanent magnet mounted to a rotor and a set of commutated stator windings. The motor further includes a circuit for changeably connecting the set of stator windings to operate in a first electrical configuration or a second electrical configuration and a circuit for commutating the set of stator windings when connected in the first electrical configuration or the second electrical configuration.

In one embodiment, the first electrical configuration comprises a wye electrical configuration, while the second electrical configuration comprises a delta configuration. Preferably, a set of stator windings comprises a first set of stator windings and a second set of stator windings equal in turns and number to the first set of stator windings. The circuit for changeably connecting the set of stator windings connects the first set of stator windings to the second set of stator windings in order to form either the wye electrical configuration or the delta electrical configuration, wherein each leg of either configuration is formed by connecting corresponding windings from the first set of stator windings and the second set of stator windings in series or parallel. For instance, to maximize rotor speed when less torque is required for a given mechanical load, the circuit for changeably connecting the second set of stator windings connects the first and second set of stator windings to form a delta electrical configuration wherein each leg of the delta electrical configuration comprises corresponding windings from each of the first and second set of stator windings connected in parallel. In a similar manner, when increased torque is required from the motor at a decreased rate of speed of the motor, the circuit for changeably connecting the stator windings connects the first and second set of stator windings to form a wye electrical configuration, wherein each leg of the wye electrical configuration comprises corresponding windings from the first and second set of stator windings connected in series.

Unlike in alternating current motors where different electrical configurations of stator windings have been used to start the motor, a brushless direct current motor of the present invention requires correct commutation of the stator windings in order to operate. Due to the 30 degree phase shift present between a wye electrical configuration of the stator windings and a delta electrical configuration of the stator windings, a 30 degree phase shift of commutations signals to the stator windings is also required. In the preferred embodiment, a motor drive circuit includes circuitry to effectuate the require 30 degree phase shift. In one embodiment, the circuitry includes two look-up tables stored in suitable memory to control an inverter drive section used to generate the commutation signals. The look-up tables are identical but for the fact that values stored in the tables are shifted by 30 electrical degrees between each other. When the motor is connected to operate in the wye electrical configuration, the look-up table corresponding to this configuration is used. Similarly, when the motor is connected in a delta electrical configuration, the second look-up table is used.

The present invention provides a motor suitable for applications when different speed and torque requirements are required during operation. For example, the present invention can be used as a drive motor in a machining apparatus. The drive motor controls movement of a table. The table supports a workpiece to be machined, moving it relative to a machining spindle. In many machining apparatuses, the load on the drive motor continually varies in a cyclic manner during machining of the workpiece. For instance, when the machine is cutting or preparing a surface of the workpiece, the torque required for moving the workpiece into engagement with the cutting tool is quite high while the rate of which the cutting tool moves relative to the surface of the workpiece is rather slow. When the machining spindle reaches the end of the surface being machined, the drive motor returns the table and thus the workpiece to or substantially near its starting position. During retraction, the cutting tool is not engaging the work surface therefore the torque placed on the drive motor is low.

The present invention provides a motor well suited for these types of cyclic loads. When the load requires a high torque and a slower rate, the motor is connected in a suitable electrical configuration, for instance, the wye electrical configuration. Similarly, when increased speed of the motor is required with less torque, the motor is connected and operated in a second electrical configuration such as the delta electrical configuration.

The invention is not limited to the machine tool art, but is merely described for purposes of possible applications. The present invention is also well suited for other mechanical applications such as drive motors for electric cars.

BRIEF DESCRIPTION OF THE DRAWINGS

FIG. 3 is a plot of motor speed versus motor torque for the electrical configurations of FIGS. 2A–2C;

FIG. 5 is a schematic representation of the motor drive.

DETAILED DESCRIPTION OF THE PREFERRED EMBODIMENTS

Figure 1:
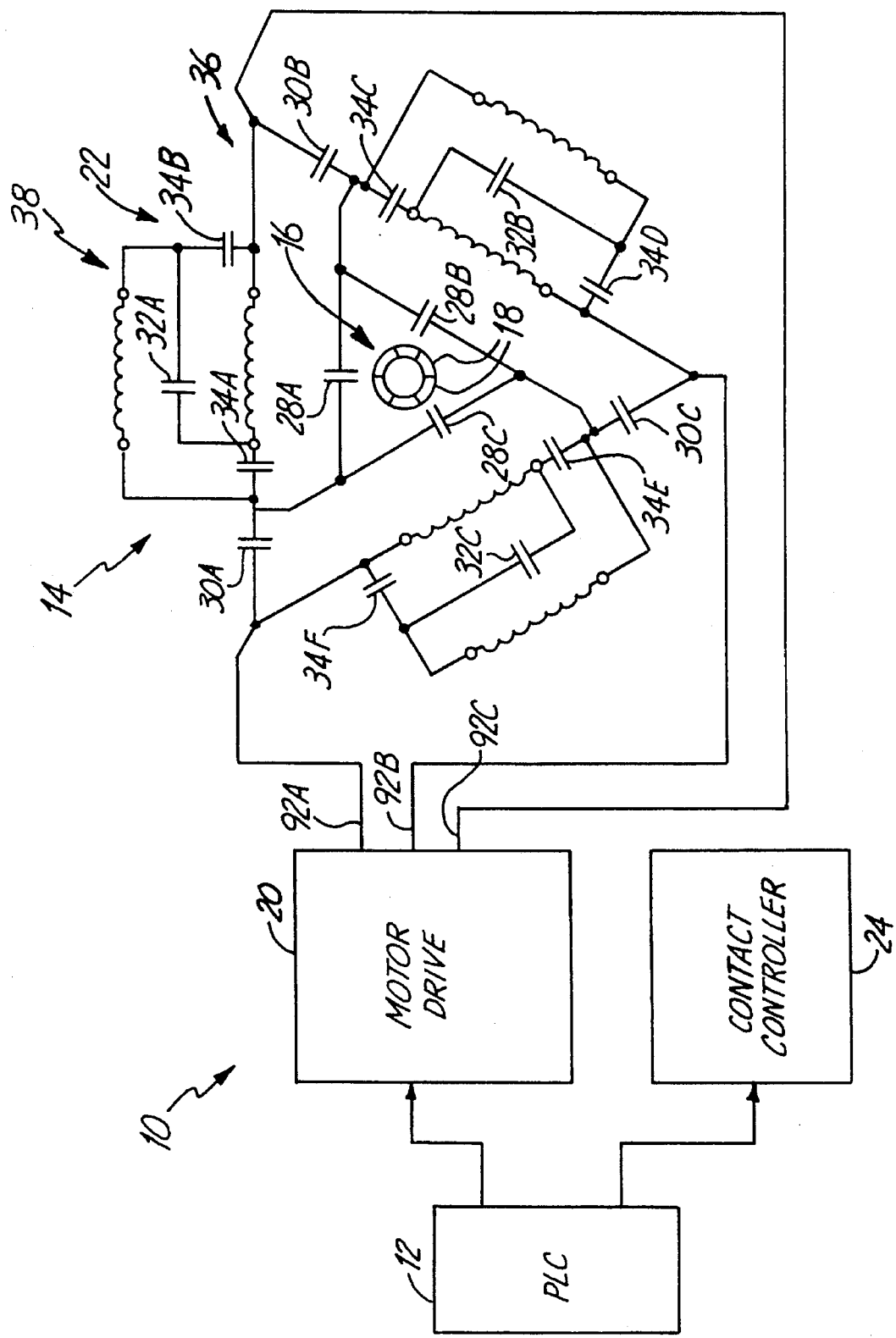
FIG. 1 is a schematic representation of a brushless direct current motor of the present invention connected to a process line controller.

A brushless direct current motor having adjustable motor characteristics of the present invention is illustrated generally at 10 in FIG. 1. The motor 10 is connected to and receives speed control signals from a controller 12 such as a process line controller used in machining apparatuses. Generally, the motor 10 includes stationary stator windings 14 mounted in a suitable frame, not shown. A rotor, schematically illustrated at 16, is also mounted to the frame for rotation about a central axis. The rotor 16 typically includes a number of permanent magnets 18 secured thereto. Preferably, the permanent magnets are made of Neodymium-Iron-Boron (NdFeB) material. Use of NdFeB magnetic material in brushless direct current motors is described in "NdFeB Magnetic Material in High Performance Brushless Servo Motors", by William G. Anderson, published in Motion Control Magazine, March, 1992, and is hereby incorporated by reference.

The motor 10 further includes a motor drive 20 that provides commutated current waveforms to the set of stator windings 14. As illustrated in FIG. 1, the stator windings 14 are connected to each other and to the motor drive with a plurality of contacts 22 which are selectively controlled by a contact controller 24. The contact controller 24 connects the set of stator windings 14 in various electrical configurations, as discussed below, to provide the motor 10 with desired speed and torque characteristics. As is conventionally known, constant torque is produced when rectangular current waveforms are applied to the stator windings 14. The current waveforms are discontinuously applied for durations of 120 degrees as opposed to the continuous application of sinusoidal current over 180 degrees in an alternating current motor. The amplitude of the electromagnetic force (EMF) in the motor 10 is proportional with rotor speed; and therefore, motor speed is controlled by controlling the voltage amplitude of the signal applied to the stator windings 14. For uniform torque generation, regardless of the rotor position, current commutation has to occur at predetermined rotor angles.

Figure 2A:
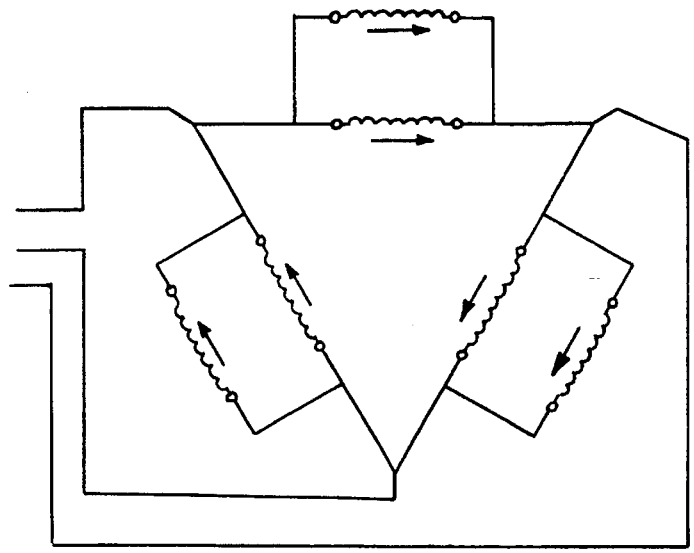
FIG. 2A is a schematic representation of stator windings of the motor of the present invention connected in a first electrical configuration.
Figure 2B:
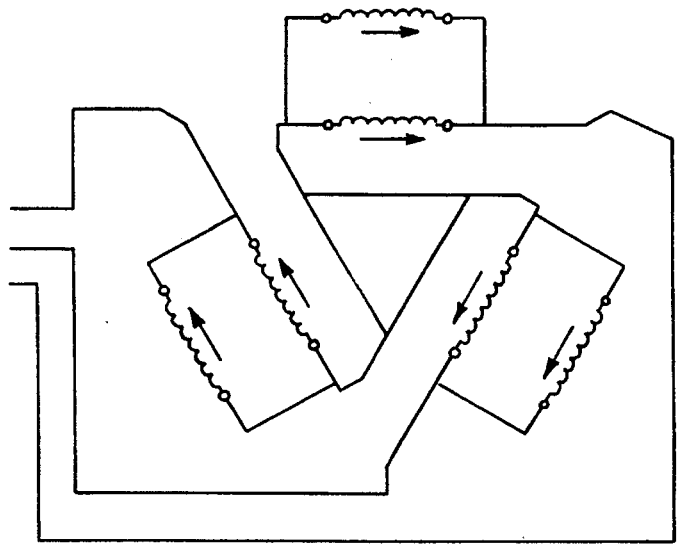
FIG. 2B is a schematic representation of stator windings of the motor of the present invention connected in a second electrical configuration.
Figure 2C:
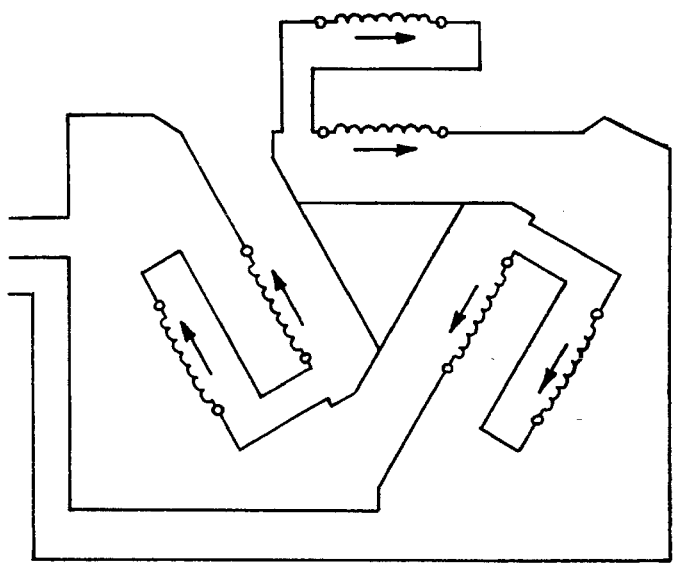
FIG. 2C is a schematic representation of stator windings the motor of the present invention connected in a third electrical configuration.

FIGS. 2A–2C illustrate three electrical configurations for operating the motor 10 to obtain various speed and torque characteristics. For purposes of explanation, the plurality of contacts 22 illustrated in FIG. 1 are separated into sub-pluralities identified as wye contacts 28A, 28B and 28C; delta contacts 30A, 30B and 30C; series contacts 32A, 32B and 32C; and parallel contacts 34A, 34B, 34C, 34D, 34E and 34F. The contacts 28A–28C, 30A–30C, 32A–32C and 34A–34F connect two sets of stator windings 36 and 38, which together comprise the set of stator windings 22, together in the various wye/delta and series/parallel configurations illustrated in FIGS. 2A–2C. Specifically, to realize the delta-parallel electrical configuration illustrated in FIG. 2A, the wye contacts 28A–28C are opened, while the delta contacts 30A–30C are closed. Likewise, to connect corresponding windings from the first set of stator windings 36 with corresponding windings from the second set of stator windings 38 in parallel, the series contacts 32A–32C are open, while the parallel contacts 34A–34F are closed.

To realize the wye-parallel electrical configuration illustrated in FIG. 2B, the wye contacts 28A–28C are closed, while the delta contacts 30A–30C are open. Like the configuration illustrated in FIG. 2A, the windings from the first set of stator windings 36 are in parallel with corresponding windings of the second set of stator windings 38 wherein the series contacts 32A–32C are open and the parallel contacts 34A–34F are closed.

In the electrical configuration illustrated in FIG. 2C, the first set of stator windings 36 and the second set of stator windings 38 are connected in a wye-series electrical configuration. Specifically, the wye contacts 28A–28C are closed, while the delta contacts 30A–30C are open. In this configuration, the series contacts 32A–32C are closed and the parallel contacts 34A–34F are open.

The speed versus torque motor characteristics for the configurations illustrated in FIGS. 2A–2C are illustrated in FIG. 3. A solid line 40A represents the speed versus torque characteristics of the delta-parallel configuration illustrated in FIG. 2A. In this configuration, the motor 10 is capable of its maximum speed for a given amperage of current and a given horsepower rating. A dashed line 40B illustrates the speed versus torque characteristics of the motor when configured as illustrated in FIG. 2B. Since the windings from the first set of stator windings 36 and the second set of stator windings 38 remain in parallel, while the configuration has changed from a delta to a wye, the maximum speed of the motor for the given amperage of current has reduced by a factor of $1.73(\sqrt{3})$, while the torque of the motor has increased by the same factor. A second dashed line 40C illustrates the speed versus torque characteristics of the motor 10 for the given amperage of current for the wye-series configuration illustrated in FIG. 2C. Since in this configuration the windings from the first set of stator windings 36 and the second set of stator windings 38 remain in a wye configuration, but the windings have been connected in series rather than parallel, the maximum speed output from the motor 10 is reduced by a factor of two with respect to the configuration illustrated in FIG. 2B. Similarly, the maximum torque has increased by a factor of two from the configuration illustrated in FIG. 2B.

It should be understood that if desired, the first set of stator windings 36 and the second set of stator windings 38 could be configured in a delta configuration wherein each winding of the first set of stator windings 36 is connected in series with a corresponding winding from the second set of stator windings 38. This configuration, although possible, is not used since the speed versus torque characteristics of the motor are generally the same as that of the configuration illustrated in FIG. 2B. Also, the speed versus torque relationships of FIG. 3 assume that the second set of stator windings 38 are substantially identical to the first set of stator windings 36, having the same number of turns in each winding. However, the number of turns does not have to be the same for every winding although the turns in the windings of each set should be the same. Of course, the relative operating characteristics illustrated in FIG. 3 between each configuration will change if the number of turns for the windings in the first set of stator windings 36 are not the same as the second set of stator windings 38.

Likewise, selectively connecting two sets of stator windings to form series and parallel circuits for each leg is also not required. The present invention includes connecting three individual windings of a brushless direct current motor between a wye electrical configuration and a delta electrical configuration with suitable circuitry.

Figure 4:
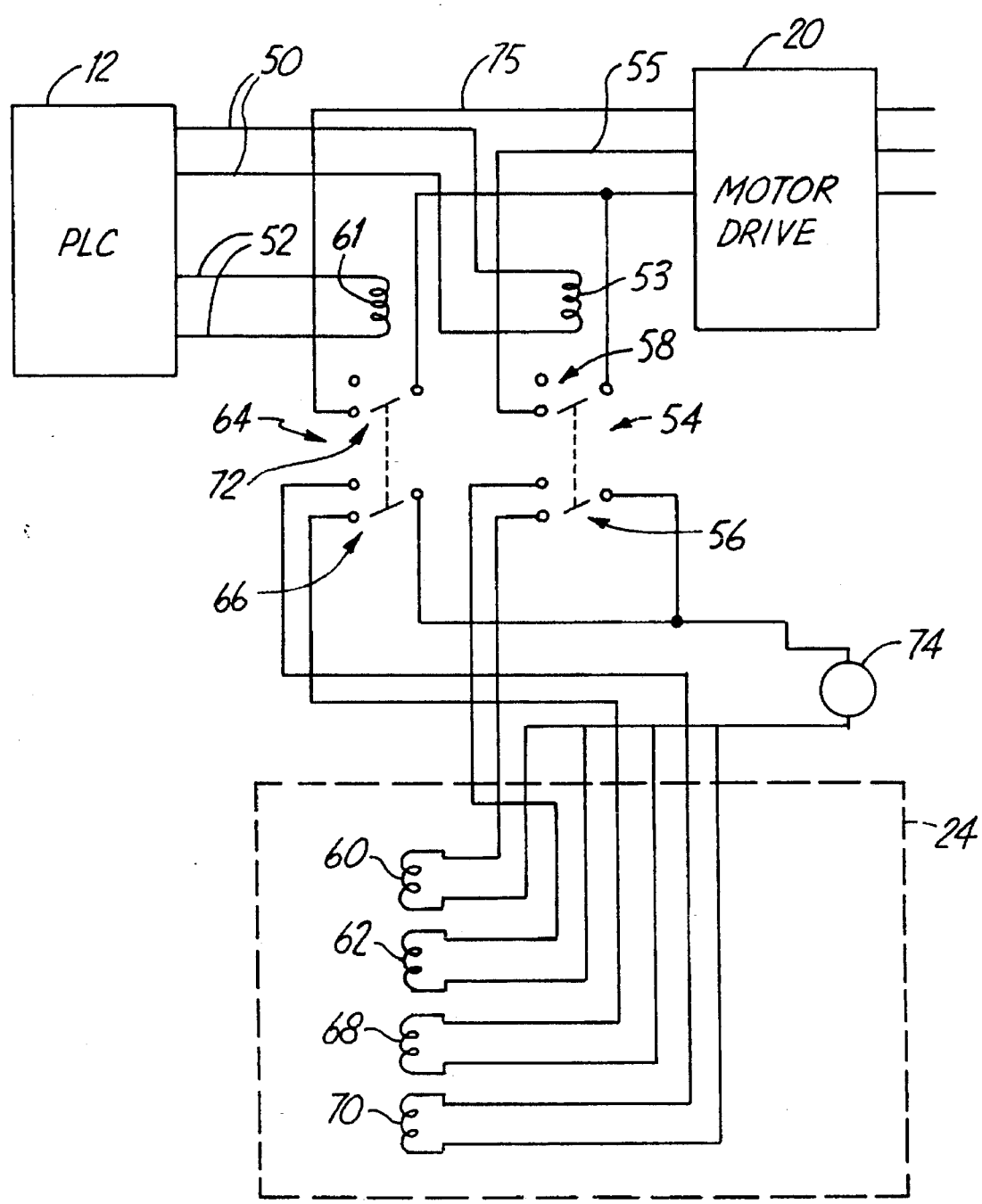
FIG. 4 is a schematic circuit of a contact controller and circuitry to connect the contact controller and a motor drive to the process line controller.

FIG. 4 illustrates the contact controller 24 in detail and connection of the motor drive 20 and the contact controller 24 to the process line controller 12. Relay assemblies 54 and 64 receive command instructions from the process line controller 12 along signal lines 50 and 52. The signal line 50 is connected to a coil 53 of the relay assembly 54. The relay assembly 54 has a first set of switchable contacts illustrated at 56 and a second set of switchable contacts 58. The relay assembly 54 energizes a coil 60, which controls the wye contacts 28A–28C, or a coil 62, which controls the delta contacts 30A–30C. The second set of relay contacts 58 parallels the state of the first set of contacts 56 in order to provide an indication to the motor drive 20 whether the stator windings are in a wye electrical configuration or a delta electrical configuration along a signal line 55.

Similarly, the signal lines 52 are connected to a coil 61 of the second relay assembly 64. The second relay assembly 64 has a first set of contacts 66 that selectively energize a relay coil 68, which controls operation of the series contacts 32A–32C, or a relay coil 70, which controls operation of the parallel contacts 34A–34F. A second set of relay contacts 72 in the second relay assembly 64 provides an indication to the motor drive 20 as to whether the windings from the first set of windings 36 are connected in series or in parallel with the corresponding windings from the second set of stator windings 38 along a signal line 75. A suitable voltage source 74 is provided for energizing the relay coils 60, 62, 68 and 70.

FIG. 5 illustrates components of the motor drive 20. A rectifier 80 receives a suitable alternating current input signal on signal lines 82 to produce a fixed positive and negative DC voltages on a positive bus 84 and a negative bus 86, respectively. A capacitor 88 is provided to maintain the positive bus 84 and the negative bus 86 within suitable limits. A three-phase inverter 90 is connected to the positive bus 84 and the negative bus 86 in a conventional manner to provide three-phase commutated current waveforms on power signal lines 92A, 92B and 92C, which are connected to the set of stator windings 22 illustrated in FIG. 1. The inverter 90 is comprised of a power transistor bridge for switching each of the signal lines 92A–92C from an open circuit condition to the positive bus 84 or the negative bus 86. The duty cycle of each transistor bridge is controlled by an inverter driver 94, herein illustrated as a logic array stored in read only memory (ROM). The logic array stored in ROM responds to rotor position feedback signals provided from a resolver 96. A resolver-to-digital converter 98 receives analog signals from the resolver 96 and converts the signals to a binary format suitable for the inverter driver 94. It should be understood that the resolver 94 is but one embodiment for sensing the angular position of the rotor 16. Any suitable sensor such as an encoder or Hall effect sensors could also be used. Likewise, suitable combinational logic could also be used instead of the logic array stored in ROM.

The inverter driver 94 receives control signals indicating the selected configuration of the stator windings along signal line 55, and whether the windings are in series or in parallel along signal line 75. In the embodiment illustrated, the inverter driver 94 includes two look-up tables, which are schematically illustrated at 100 and 102. The look-up tables 100 and 102 are identical having suitable values to control the power transistors of the inverter 90. However, corresponding values between the look-up table 100 and the look-up table 102 are shifted by 30 electrical degrees in order to provide proper commutation of the stator windings when connected in either the delta electrical configuration of FIG. 2A or the wye electrical configurations of FIGS. 2B and 2C. Other means for providing proper commutation control signals to the inverter 90 could also be used. For instance, two resolvers could be selectively connected to the resolver-to-binary converter 96, which in turn provides signals to an inverter driver having a single look-up table. One of the resolvers would be adjusted to provide a rotor position signal suitable for use with a wye electrical configuration of the stator windings, while the other would be adjusted to provide a rotor position signal suitable for use with a delta electrical configuration. Suitable circuitry would be provided to connect the correct resolver to the inverter driver 94 depending on whether the stator windings were connected in the wye electrical configuration or the delta electrical configuration. In another form of providing a 30 degree electrical phase-shift, the resolver could be physically rotated to provide the 30 degree phase-shift as needed. Of course, multiple encoders or multiple Hall effect sensors could also be used in place of the multiple resolvers as described above.

An over-speed limit circuit 108 prevents the contacts 28A–28C, 30A–30C, 32A–32C and 34A–34F from being switched from one electrical configuration to another if the motor speed is above a selected level herein, by way of example, illustrated as 200 RPM. The circuit 108 includes a comparator 110 which receives a signal along a signal line 112 proportional to the velocity of the rotor 16. A second reference signal provided on signal line 114 corresponds to the selected maximum motor speed in which the electrical configurations can be changed. If the motor speed exceeds the preselected limit, a signal on signal line 116 is provided to the process line controller 12 in order to prevent switching. Switching is not recommended when the induced voltage from the windings would exceed the capability of the inverter 90. In the configurations illustrated in FIGS. 2A–2C, an over-voltage condition could arise when switching from the configuration of FIG. 2A to either of the configurations of FIGS. 2B or 2C, or when switching from the configuration of FIG. 2B to the configuration of FIG. 2C.

Although the present invention has been described with reference to preferred embodiments, workers skilled in the art will recognize that changes may be made in form and detail without departing from the spirit and scope of the invention. For instance, although described above with respect to forming winding configurations from interconnecting two sets of stator windings, it is within the scope of the present invention to also use suitable circuitry to separately connect separate sets of windings to the inverter, each set of windings being permanently connected in different electrical configurations. Switchable contacts would then be provided to connect the selected electrical configuration to the inverter in order to operate the motor.

What is claimed is:

1. A brushless direct current motor comprising:

a permanent magnet rotor;

a set of stator windings;

means for changeably connecting the set of stator windings to operate in a first electrical configuration or a second electrical configuration;

phase shift means for providing a phase shift of commutation signals for the set of stator windings as a function of operation in the first electrical configuration or the second electrical configuration;

commutation means operably connected to the phase shift means for commutating the set of stator windings when connected in the first electrical configuration or the second electrical configuration.

2. The motor of claim 1 and sensing means operably connected to the phase shift means, the sensing means sensing an angular position of the rotor and providing a representative signal of angular position to the phase shift means.

3. The motor of claim 2 wherein the first electrical configuration comprises a wye-connected set of stator windings and the second electrical configuration comprises a delta-connected set of stator windings.

4. The motor of claim 3 wherein the phase shift means provides a 30 degree phase shift of commutation signals.

5. The motor of claim 4 wherein the phase shift means comprises a first look-up able for commutating the wye-connected set of stator windings and a second look-up table for commutating the delta-connected set of stator windings.

6. The motor of claim 2 wherein the sensing means comprises a resolver.

7. The motor of claim 1 wherein the set of stator windings comprises a first set of stator windings and a second set of stator windings.

8. The motor of claim 7 wherein the first electrical configuration comprises each of the windings of the first set of stator windings being connected in series with a corresponding winding of the second set of stator windings.

9. The motor of claim 8 wherein the second electrical configuration comprises each of the windings of the first set of stator windings being connected in parallel with a corresponding winding of the second set of stator windings.

10. The motor of claim 9 wherein the first electrical configuration comprises a wye-connected set of stator windings and the second electrical configuration comprises a delta-connected set of stator windings.

11. The motor of claim 10 wherein the means for changeably connecting further connects the set of stator windings in a third electrical configuration.

12. The motor of claim 11 wherein the third electrical configuration comprises a wye electrical configuration wherein each of the windings of the first set of stator windings are connected in parallel with a corresponding winding of the second set of stator windings.

13. The motor of claim 9 wherein the first electrical configuration comprises a wye-connected set of stator windings and the second electrical configuration comprises a wye-connected set of stator windings.

14. The motor of claim 1 and further comprising measuring means for measuring a rotational speed of the rotor, the measuring means being operably connected to the means for changeably connecting the stator windings such that changes between the first electrical configuration and the second electrical configuration occur only when the rotational speed is less than a selected level.

15. A brushless direct current motor comprising:

permanent magnet rotor;

a set of stator windings comprising a first plurality of stator windings and a second plurality of stator winding;

means for changeably connecting the set of stator windings to operate in a wye electrical configuration or a delta electrical configuration;

means for sensing an angular position of the rotor and providing a representative signal of angular position;

phase shift means operably connected to the means for sensing to receive the representative signal, the phase shift means providing a 30 degree phase shift of commutation signals for the set of stator windings as a function of operation in the wye electrical configuration or the delta electrical configuration;

commutation means operably connected to the phase shift means for commutating the set of stator windings when connected in the wye electrical configuration or the delta electrical configuration.

16. The motor of claim 15 wherein the wye electrical configuration comprises each of the windings of the first plurality of stator windings being connected in series with a corresponding winding of the second plurality of stator windings.

17. The motor of claim 16 wherein the delta electrical configuration comprises each of the windings of the first plurality of stator windings being connected in parallel with a corresponding winding of the second plurality of stator windings.

18. The motor of claim 15 wherein the phase shift means comprises a first look-up table for commutating the stator windings in the wye electrical configuration and a second look-up table for commutating the stator windings in the delta electrical configuration.

19. The motor of claim 18 wherein the means for sensing comprises a resolver.

20. The motor of claim 15 wherein the means for changeably connecting comprises a relay having a plurality of contacts.

21. A brushless direct current motor comprising:

a permanent magnet rotor a first set of stator windings;

a second set of stator windings;

means for selectively connecting the first and second set of stator windings to operate in a wye electrical configuration wherein each of the windings of the first set of stator windings are connected in series with a corresponding winding of the second set of stator windings or a delta electrical configuration wherein each of the windings of the first set of stator windings are connected in parallel with a corresponding winding of the second set of stator windings;

a sensor operably coupled to the rotor to sense an angular position of the rotor, the sensor providing a sensor signal representing the angular position;

a look-up table for providing a phase shift of commutation signals for the set of stator windings as a function of operation in the first electrical configuration or the second electrical configuration;

a plurality of solid state switches connected to the set of stator windings;

a controller operably connected to the look-up table, the plurality of switches and the sensor to receive the sensor signal, the controller receiving an input indicating that the set of stator windings are connected to operate in the wye electrical configuration or the delta electrical configuration, the controller using the look-up table for generating control signals to commutate the set of stator windings when connected in the wye electrical configuration or the delta electrical configuration as a function of the input.

* * * * *

UNITED STATES PATENT AND TRADEMARK OFFICE
CERTIFICATE OF CORRECTION

PATENT NO. : 5,614,799
DATED : March 25, 1997
INVENTOR(S) : Anderson et al.

It is certified that error appears in the above-indentified patent and that said Letters Patent is hereby corrected as shown below:

```
Column 7, line 38, replace "able" with --table--.

Column 8, line 11, before "permanent" insert
--a--.

Column 9, line 3, replace "first" with --wye--.

Column 9, line 4, replace "second" with
--delta--.
```

Signed and Sealed this

Twelfth Day of August, 1997

Attest:

BRUCE LEHMAN

*Attesting Officer*       *Commissioner of Patents and Trademarks*